United States Patent
Maas et al.

(10) Patent No.: US 9,514,505 B2
(45) Date of Patent: Dec. 6, 2016

(54) WATERMARK DETECTION WITH PAYLOAD

(71) Applicant: CIVOLUTION B.V., Eindhoven (NL)

(72) Inventors: Martijn Maas, Eindhoven (NL); Mehmet Utku Celik, Eindhoven (NL)

(73) Assignee: Civolution B.V., Eindhoven (NL)

( * ) Notice: Subject to any disclaimer, the term of this patent is extended or adjusted under 35 U.S.C. 154(b) by 28 days.

(21) Appl. No.: 14/350,793

(22) PCT Filed: Oct. 9, 2012

(86) PCT No.: PCT/NL2012/050700
§ 371 (c)(1),
(2) Date: Apr. 9, 2014

(87) PCT Pub. No.: WO2013/055206
PCT Pub. Date: Apr. 18, 2013

(65) Prior Publication Data
US 2014/0270340 A1    Sep. 18, 2014

Related U.S. Application Data

(60) Provisional application No. 61/545,240, filed on Oct. 10, 2011.

(30) Foreign Application Priority Data

Oct. 10, 2011 (NL) ..................................... 2007557

(51) Int. Cl.
*G06K 9/00* (2006.01)
*G06T 1/00* (2006.01)
(Continued)

(52) U.S. Cl.
CPC ........... *G06T 1/0071* (2013.01); *G10L 19/018* (2013.01); *H04N 21/8358* (2013.01)

(58) Field of Classification Search
CPC .... G06T 1/0021; G06T 1/0028; G06T 1/0035; G06T 1/0042; G06T 1/005; G06T 1/0057; G06T 1/0064; G06T 1/0071; G06T 1/0078; G06T 1/0085; G06T 1/0092; G06T 2201/005; H04N 1/32144; H04N 1/3232; H04N 1/32331; H04N 1/32325
See application file for complete search history.

(56) References Cited

U.S. PATENT DOCUMENTS

| 8,301,893 B2* | 10/2012 | Brundage | ............. G06T 1/0071 713/176 |
| 2003/0185417 A1* | 10/2003 | Alattar | .................. G06T 1/0064 382/100 |

(Continued)

FOREIGN PATENT DOCUMENTS

| EP | 1215625 | 6/2002 | | |
| NL | WO 2009077944 A1 * | 6/2009 | ........... | G06T 1/0071 |

(Continued)

OTHER PUBLICATIONS

PCT International Search Report mailed on Nov. 27, 2012 for PCT Application PCT/NL2012/050700 filed on Oct. 9, 2012 in the name of CIVOLUTION B.V.

*Primary Examiner* — Avinash Yentrapati
(74) *Attorney, Agent, or Firm* — Mark J. Nahnsen; Barnes & Thornburg LLP

(57) ABSTRACT

A method for detecting a payload embedded using watermarking in a content stream, the payload being different in a first and a second segment of the content stream, a payload in the second segment having a predetermined relationship with a payload in the first segment, is described. The method selects a point in the content stream where the first segment is likely to end and the second segment to being, samples the stream to obtain a first set of samples that is before the
(Continued)

chosen point and a second set of samples that is after the chosen point, and detects the payload on a combination of the first set and a transformation of the second set, where the transformation is based on the assumption that the second set is from the second segment and exploits the relationship that exists between the payloads in the first and second segments.

12 Claims, 4 Drawing Sheets

(51) Int. Cl.
  *H04N 21/8358* (2011.01)
  *G10L 19/018* (2013.01)

(56) References Cited

U.S. PATENT DOCUMENTS

| | | | |
|---|---|---|---|
| 2005/0180594 A1* | 8/2005 | Isogai | G06T 1/0085 |
| | | | 382/100 |
| 2006/0104477 A1* | 5/2006 | Isogai | G06T 1/0078 |
| | | | 382/100 |
| 2014/0142958 A1* | 5/2014 | Sharma | G10L 19/018 |
| | | | 704/500 |

FOREIGN PATENT DOCUMENTS

| | | |
|---|---|---|
| WO | 2007/049184 | 5/2007 |
| WO | 2007/032758 | 12/2008 |
| WO | 2009/077944 | 6/2009 |

\* cited by examiner

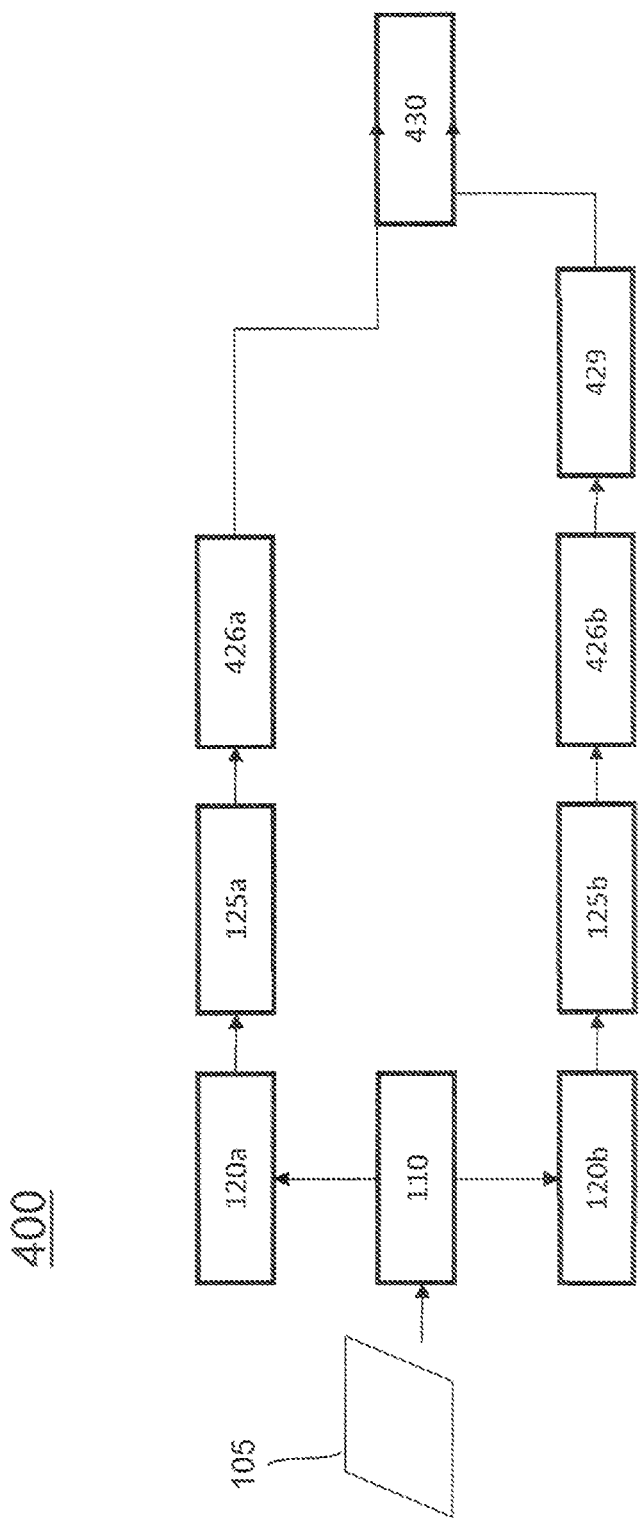

WATERMARK DETECTION WITH PAYLOAD

CROSS REFERENCE TO RELATED APPLICATIONS

The present application is the US national stage of International Patent Application PCT/NL2012/050700 filed on Oct. 9, 2012 which, in turn, claims priority to Dutch Patent Application No. NL 2007557 and U.S. Provisional Patent Application No. 61/545,240 both filed on Oct. 10, 2011.

FIELD OF THE INVENTION

The invention relates to a method of detecting a watermark embedded in a content stream, the watermark having a payload being different in a first and a second segment of the content stream, a payload in the second segment having a predetermined relationship with a payload in the first segment. Further, the invention relates to a system and a computer program product.

BACKGROUND OF THE INVENTION

Encoders in popular types of watermarking system encode a payload into one or more watermark patterns, which are then embedded in the content. Often, the watermark patterns are pseudo-random and the payload is encoded in the circular shift of the patterns. The watermark patterns may be represented in either the temporal or the spatial domain. Alternatively the payload may be encoded directly in a binary watermark pattern, possibly enhanced with error-correcting capabilities, XOR-ed with a pseudo-random sequence, or encoded in some other way.

In such watermark systems a detector accumulates a number of samples, for example audio samples in an audio watermarking system or video frames in a video watermarking system. From these samples, the detector extracts the features in which the watermark was embedded and attempts to match these features with a given detection pattern. For example, in correlation-based watermarking systems the payload embedded in the content can be derived from the presence of correlation peaks and their relative positions. Detection requires that the detector has obtained a large enough accumulation to get high enough correlation peaks, resulting in a reliable detection. We denote the accumulated samples on which the detection is performed by the detection window.

In many watermark systems, the embedder regularly changes the payload, for example to update a time stamp. If there is a payload change within the detection window, the detector may fail to find a good match for the single expected watermark. This may result in detections with lower reliability or even the failure to detect if the peaks are below the detection threshold.

The detector typically does not know in advance that a payload change occurred in the detection window. When it tries to detect on a detection window with a payload change, the parts of the window with different payloads may act on each other as noise, hampering the detection. Or, even worse, the interaction between the different payloads present in the detection window may cause false payloads.

The state of the art does not adequately address this issue. Known methods to mitigate the negative effects of payload changes include trying detection windows of different sizes, and use running windows to step through the available samples with small step size, which increases the detector complexity, and designing systems with less frequent payload changes, which limits the granularity of the time stamp in the payload.

Such methods are limited in their effect and introduce additional complexities or limitations.

SUMMARY OF THE INVENTION

The invention provides a method as claimed in claim 1. According to the invention, first a point is selected in the content stream where the first segment is likely to end and the second segment is likely to begin. This point is usually arbitrarily chosen, as no a priori knowledge is available as to where the segments begin and end. However, if side information is available as to this point, such information is of course preferably exploited. For example, if a previously chosen point resulted in a successful detection, the new point should be chosen at a distance equal to the segment size from the previously chosen point. The segment size is the period during which the payload remains constant.

Second, the method according to the invention samples the stream to obtain two sets of samples: the first being from before the chosen point and the second being from after the chosen point. And third, a watermark detection is performed on the first set and a transformation of the second set. This transformation assumes that the second set is from the second segment and thus exploits the fact that there is a relationship between the payload in the first and second segments. The transformation essentially applies the inverse of the relationship to the content after the chosen point or breakpoint (the part after the point where the change occurs), for example by transforming the correlation buffer of the second part such that the each position in the correlation buffer is moved to the corresponding position where it would have been for the previous payload before the payload change.

For example, if the payload increases by a fixed number, e.g. a timestamp that changes every second, then the transformation would comprise a reverted shift that corresponds to a subtraction of that fixed number, e.g. the one second, from the timestamp. Such a deterministic transition is easy to revert in the general case.

However, the transition between two watermark patterns may be nondeterministic, i.e. plural possible transitions may exist between the watermark patterns in the first and the second segment, and the transformation comprises electing one of the plural possible transitions which has a relatively highest probability of being present at the chosen point.

In a further embodiment the method comprises, upon a failure to detect the watermark patterns using the elected possible transition, repeatedly electing a further possible transition from the plural possible transitions until either the watermark pattern has been detected or the probability of the further possible transition is below a predefined threshold. A transition may be predetermined but could also be dependent on the payload. However, after a watermark pattern is detected, the detector needs to check the validity of the detection by checking if the elected transition matches with the detected payload.

This approach is based on the fact that although the detector does not know the actual payloads, it may know the relation between them. For example, the payload change may be a fixed increment of the time stamp part of the payload. This relation between subsequent payloads may dictate a regular shift in the positions of the watermark. The invention eliminates the negative effects of a payload change in the detection window. Consequently, the detector is more robust, as it can perform detections on larger accumulations. Alternatively, the embedder can update the payload more frequently without decreasing the detector robustness. The downside is an increase in detector complexity, though this may be limited by optimizing the search strategy for the breakpoint.

The invention exploits this knowledge by mapping the second part of the detection window onto the first part of the detection window. This way any features from the two payloads present in the detection window are aligned and amplify each other to form a better set of features to attempt detection on. The invention then essentially enables detection results for the first payload on the whole detection window as if there were no payload change at all.

As the watermark detector does usually not know the exact location of the breakpoint in the detection window, this document uses the term 'chosen point' to indicate the estimate or best guess of the breakpoint. Making this guess is typically done by trial-and-error (though there may be several optimizations possible to speed up the search). Hence the payload mapping can be seen as a gain in robustness at the expense of higher detector complexity. In a simple embodiment, the chosen point is arbitrarily chosen, say as the center point in the detection window.

One optimization comprises, upon failure to detect the watermark pattern, at least one new point is selected based on the location of the chosen point and a length of the first or the second segment, and the steps of sampling and performing the detecting are repeated. Preferably one may select two new points at a distance substantially equal to the length of the first or the second segment, where the old chosen point being substantially halfway the first new chosen point and the second new chosen point. This is a simple and fast, yet effective, way of selecting points in the hopes of detecting the watermark patterns. In an optimization the second new point is only processed if the first new chosen point does not provide a successful detection.

The exact definition of the payload mapping for a particular watermark system depends on the way the payload is encoded into the watermark pattern and on the change between two subsequent payloads. Often there are several mappings possible, the correct one depending on the actual value of the payload. Since the payload is not yet known to the detector at that time, it needs to try each possible payload mapping and check a posteriori the validity of the mappings for the resulting payload.

Alternatively, upon a failure to detect the watermark pattern, the method should be repeated until either the watermark pattern is detected or a chance of detecting the watermark is below a predefined threshold.

A large variety of watermarking detection algorithms is available. Preferably detecting the watermark pattern comprises accumulating data from the content stream and correlating for a detection pattern on features extracted from the accumulated data. In such an embodiment the transformation takes place on one of:

(a) accumulated data accumulated from after the chosen point, (b) a result of the correlation of this accumulated data with the detection pattern, (c) a further detection pattern that is designed to correlate with features in the second segment, and (d) a part of the detection pattern so as to correlate with features in the second segment.

In a further embodiment, wherein the watermark pattern represents a number of repetitions of a binary representation of the payload and the step of detecting comprises extracting features from the first and the second set of samples, and applying a majority voting algorithm on corresponding features for the different repetitions to determine the payload, wherein the transformation takes place as part of the extraction of the features in the second segment.

In a further embodiment circular correlation may be done in the frequency domain for efficiency. The mapping may also be implemented in the frequency domain.

The invention further provides for a system that executes the method of the invention and a computer program product that causes a programmable device to execute the method of the invention.

BRIEF DESCRIPTION OF THE FIGURES

The invention will now be elaborated upon with reference to the figures, in which:

FIG. 4 schematically shows a fourth embodiment of a watermark detector according to the invention.

Same reference numerals indicate same or similar features. Where a numeral is followed by a letter, e.g. 120*a*, 120*b*, this indicates that the feature is duplicated within the shown context, for example as two items operating in parallel.

DETAILED DESCRIPTION OF CERTAIN EMBODIMENTS

Figure 1:
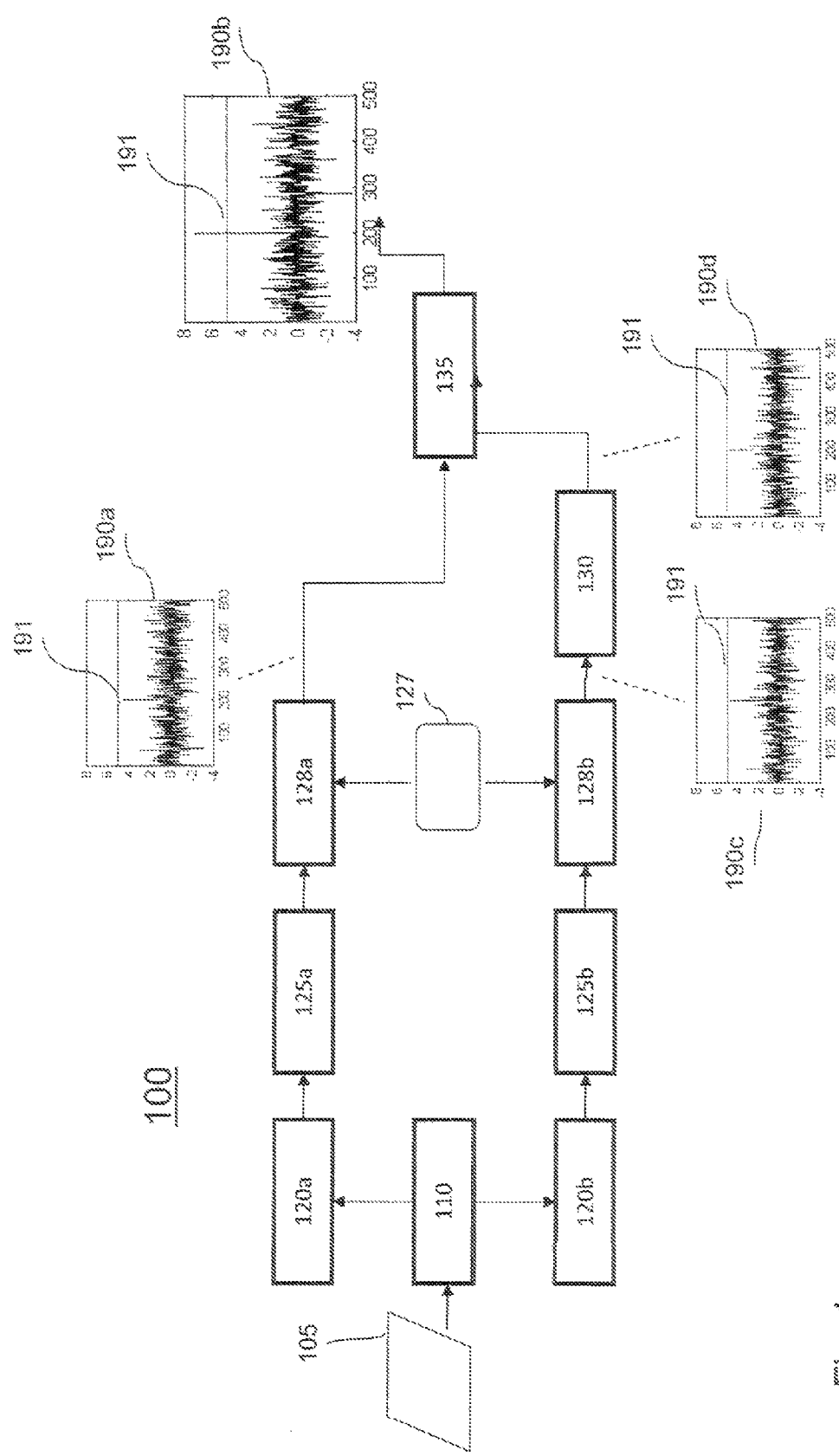
FIG. 1 schematically shows a first embodiment of a watermark detector according to the invention.

FIG. 1 schematically shows a first embodiment of a watermark detector 100 according to the invention. The detector is designed to detect a watermark embedded in a content stream 105. This watermark carries a payload, the payload being different in a first and a second segment of the content stream, a payload in the second segment having a predetermined relationship with a payload in the first segment.

The watermark detector 100 comprises a splitter 110 for selecting a point in the content stream 105 where the first segment ends and the second segment begins, two sample accumulators 120*a*, 120*b* that each accumulate samples from the content stream, where accumulator 120*a* accumulates samples from before the chosen point and accumulator 120*b* accumulates samples from after the chosen point. Two feature extractors 125*a*, 125*b* attempt to extract the features in which the watermark was embedded from the samples accumulated by the respective accumulators 120*a*, 120*b* and two correlators 128*a*, 128*b* that correlate the extracted features with given watermark patterns 127. The payload embedded in the content stream in this embodiment is derived from the presence of correlation peaks and their relative positions.

A payload mapper 130 operates on the output of the second correlator 128*b* to transform the correlated features from the samples accumulated from after the chosen point. This transformation is based on the assumption that the second set is from the second segment and exploits the relationship that exists between the payloads in the first and second segments. The output of the payload mapper 130 is combined with the output of correlator 128a, and the actual watermark detection is performed at detector 135 on this combined set of correlated features.

As the splitter 110 does not know the breakpoint, an estimate must be made. To this end, it may simply select an arbitrary location, for example exactly halfway the buffer or at a randomly chosen location.

Optionally, the splitter 110 operates to split only if a normal detection of one watermark payload fails. The failure to detect a watermark may suggest that a breakpoint has occurred in the content and that in fact two watermarks are present. By applying the method of the invention the two watermarks are essentially collated into one, which has a better chance of being detected.

The choice for the chosen point may be configured in advance and used throughout the detection process. Alternatively, upon failure to detect the watermark features, at least one new point is selected based on the location of the chosen point and a length of the first or the second segment, and the steps of sampling and performing the detecting are repeated. Preferably one may select two new points at a distance substantially equal to the length of the first or the second segment, where the old point being substantially halfway the first new point and the second new point.

The graphs 190a, 190b, 190c, 190d graphically illustrate the result of correlating features with detection patterns. The horizontal bar 191 in each graph indicates the threshold used to determine if there is a correlation strong enough to conclude that a particular watermark is present and hence a particular payload has been detected.

Many watermarking techniques are available that are suitable for the present invention. In one embodiment the watermarking embeds a spatial watermark in the frames of a piece of video content. The spatial watermark is represented by a number of two-dimensional, pseudo-random patterns, called watermark tiles. These tiles are known to both the embedder and the detector. Assume a method to embed such a tile in a frame by adapting the corresponding pixels. This embedding may involve tile replication to match the size of the frame, a psycho-visual model for computing the pixel changes, adapting pixels according to the corresponding tile value and visual model, etc.

Detection the presence of a watermark tile in a frame occurs by performing a 2D correlation of the frame with the corresponding tile and obtaining a correlation buffer with a peak above a certain threshold. This may involve accumulating frames, filtering, scaling to original size, folding the tile replications, etc. The position of the correlation peak in the 2D correlation buffer indicates the position of the tile in the frame. Generally, the detector will need to accumulate a certain number of frames before such detection method will yield a reliable correlation peak and thus a reliable detection.

To encode a payload, the system in this embodiment uses two different watermark tiles, which are embedded simultaneously in every frame. The first tile serves as a reference tile and the second as a payload tile. The embedder encodes the payload information by performing a 2D cyclic shift on the payload tile. The detector recovers the payload by looking at the relative positions of the peaks for the payload tile with respect to the reference tile. Obviously, the method may alternatively use a higher number of tiles. Also the different tiles may be separately embedded in different frames rather than simultaneously in the same frames.

Figure 2:
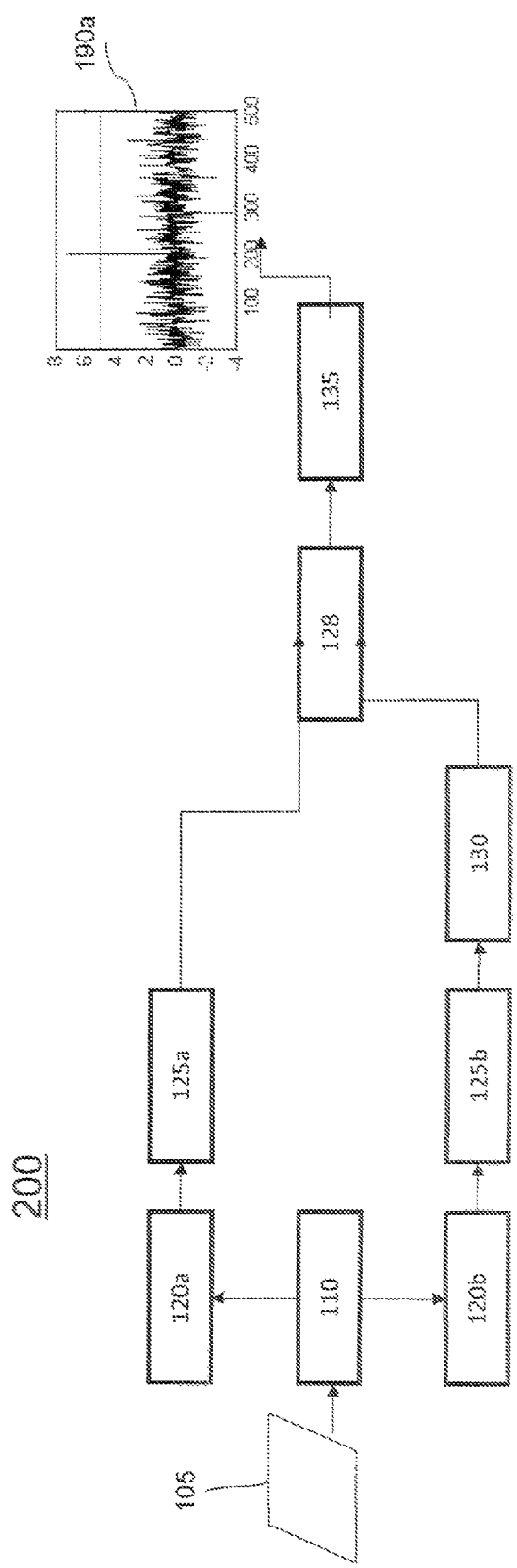
FIG. 2 schematically shows a second embodiment of a watermark detector according to the invention.

FIG. 2 schematically shows a second embodiment of a watermark detector 200 according to the invention. The watermark detector 200 largely is the same as watermark detector 100, but the payload mapper 130 is now positioned before the correlation operation, meaning that only a single correlator 128 is necessary. The transformation is now applied to the accumulated data before correlation with the detection pattern.

Figure 3:
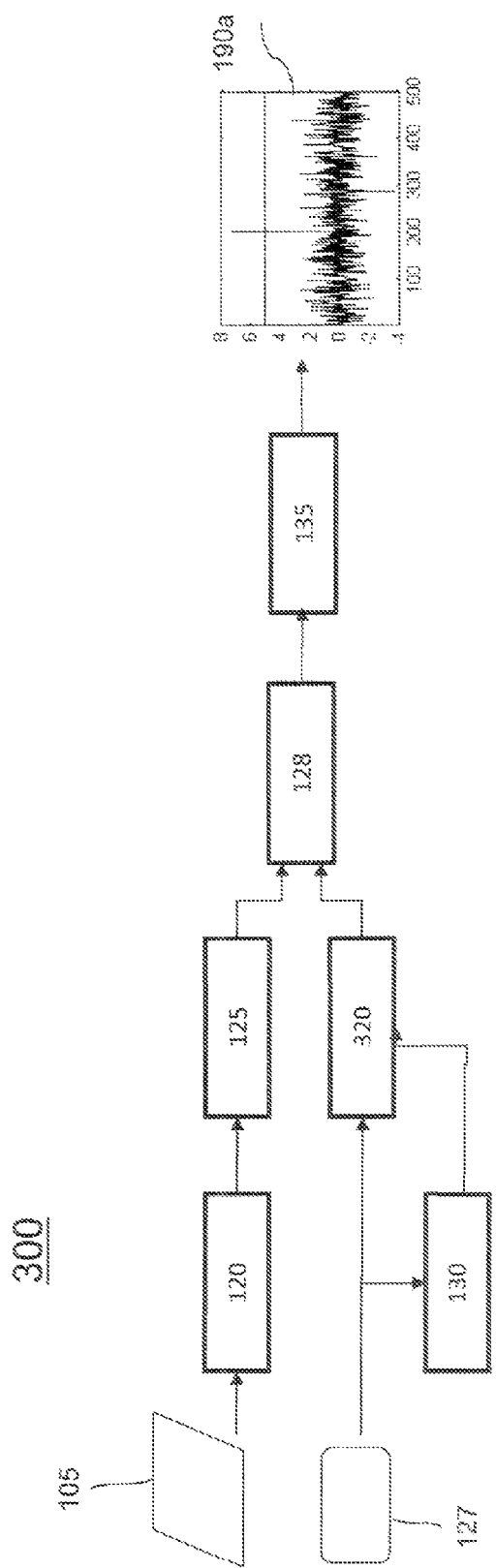
FIG. 3 schematically shows a third embodiment of a watermark detector according to the invention.

FIG. 3 schematically shows a third embodiment of a watermark detector 300 according to the invention. The watermark detector 300 differs from detectors 100 and 200 in that the transformation is now performed on a further detection pattern that is designed to correlate with features in the second segment. Watermark payload mapper 130 receives a pattern representing the watermark for the payload expected before the chosen point and transforms this into a pattern for the payload expected after the chosen point. Watermark pattern combiner 320 combines this transformed pattern with the original watermark pattern, and supplies the combined watermark pattern to the correlator 128.

In this embodiment, a watermarking system is employed that embeds a temporal watermark in the frames of the content. The temporal watermark is represented by a one-dimensional binary watermark pattern. The watermark pattern is constructed out of a number of pseudo-random sub-patterns. This embodiment uses two sub-patterns that are intertwined to form the watermark pattern, although more than two sub-patterns could easily be used if desired. One sub-pattern serves as a reference pattern and the other as a payload pattern. The payload is embedded in the relative shift of the payload pattern with respect to the reference pattern. Preferably the system embeds a single symbol (represented by a bit) in a frame, but alternatively the system may embed multiple symbols per frame, or spread a single symbol over multiple frames; for simplicity we assume a single symbol per frame. Detecting a sequence of bits in a detection window consisting of a number of consecutive frames involves circular correlation. The longer the detection window, the more reliable the detection may be.

The detector 300 processes a detection window as follows. Preferably the frame rate of the detection window is equal to the original embedding frame rate. If this is not true, then first the scale needs to be detected and the detection window should be scaled back to the original frame rate. The reference pattern may be used for this purpose.

The feature extractor 125 creates a one-dimensional signal by estimating the embedded symbols in each of the frames. Next the correlator 128 takes the odd entries of this signal and performs a cyclic correlation with the reference pattern. This gives a one-dimensional correlation buffer. If there is a high enough peak in the correlation buffer, the detector concludes the reference pattern was embedded in the odd frames. The position of the peak in the correlation buffer indicates the start of the reference pattern. If there was no peak in the reference correlation buffer, the detector changes the roles of the odd and even frames and tries again.

Next, the correlator 128 performs a cyclic correlation of the even entries of the extracted signal with the payload pattern. Again, a peak above the threshold indicates the presence of this payload pattern, and its location gives the start of the pattern. The payload is recovered from the difference between the two patterns extracted from the even and odd entries. Obviously, the threshold for peak detection in the correlation buffers should be chosen such that the probability for noise peaks above the threshold is very small, while the probability for accepting correct peaks is sufficiently large.

In general, the detection window will contain an unknown section of the watermark pattern. It does not necessarily start at the beginning of the pattern, and may contain one or more transitions from one repetition of the watermark pattern to the next. Because the payload is encoded in the relative circular shift of the payload pattern with the reference pattern and the correlation is done in a circular fashion, the detector can still decode the payload, no matter the offset from the start of the pattern at the beginning of the detection window. For simplicity, we assume in this example that the detection window covers no more than one full period of the watermark pattern; the detection process is easily extendible to when it does.

The mapping is now defined by inverting the change in the patterns induced by the payload change. The combiner 320 then constructs new watermark patterns by taking the original ones and the mapped ones, and combining them at the breakpoint. These newly constructed watermark patterns are correlated with the extracted features in the accumulation buffers to get the correlation results in correlator 128.

To process a detection window containing a payload change, the combiner 320 proceeds as follows. The reference pattern can simply be detected as before, because the payload change does neither affect the reference pattern nor the phase of the watermark pattern. The embedded payload pattern, however, is a combination of the old payload pattern before the breakpoint and the new pattern after the breakpoint. The exact composition is determined by the payload embedded and the moment in time the breakpoint occurred.

Note that both the old and the new payload pattern are shifts of the same pattern. The detector does not know either of the shifts. It does know, however, the relation between the two shifts: the new pattern is shifted a certain number of positions more than the old pattern. This means the combiner 320 can try to construct a new payload pattern by mapping part of the payload pattern onto the positions corresponding to the payload before the payload change. This can be done by taking half of the pattern as is and the other half shifted over the number of positions that the new pattern shifted, i.e., mapped onto the previous payload. Instead of taking a breakpoint at the middle of the pattern, one may also employ a breakpoint at an arbitrary different position of course.

As the combiner 320 does not know the breakpoint, an estimate must be made. To this end, it may simply select an arbitrary location, for example exactly halfway the buffer or at a randomly chosen location. Preferably however the combiner 320 generates different breakpoints, allowing the combiner 320 to construct plural trial payload patterns for each of these different breakpoints and compute the correlation with the symbols extracted from the video.

When the breakpoint is exactly right for a certain trial, the correlation buffer has a high peak at the position corresponding to the payload before the payload change. If the breakpoint is not exactly right but close, then the payload pattern trial may still be a good enough approximation and give a sufficiently high peak. The better the approximation of the breakpoint, the higher the resulting peak in the correlation buffer will be. To get to the right breakpoint, the combiner 320 may use a trial-and-error approach, stepping through the possible breakpoint positions, possibly with a certain step size. Alternatively, a hierarchical approach can be adopted. In certain cases, optimizations in the search strategy may be possible.

In a further embodiment, to increase the payload capacity, multiple versions may be employed for the payload pattern and information may be encoded in the choice of which pattern to use. In this embodiment, the correlator 128 correlates the samples with all versions of the payload pattern. In case there was no payload change in the detection window, only one of the correlations will have a high peak. The payload can then easily be derived from the peak position and the particular buffer containing the peak. In case there is a payload change, the definition of the new payload pattern with respect to the old one depends on the actual payload value. These possibilities may have different probabilities. Only one of these is correct, depending on the actual payload. Since the correlator 128 does not know the payload beforehand, it may try all types. If either payload mapping type results in detection, the found payload can be used for an a posteriori validity check on the payload condition.

FIG. 4 schematically shows a fourth embodiment of a watermark detector 400 according to the invention. In the previous embodiments, the payload was encoded in the watermark pattern as the relative circular shift for a number of pseudo-random patterns. In this embodiment the payload is instead specified directly by its binary representation, and possibly extended with an error-correcting code. This relatively short bit string is then embedded repeatedly in the content. To retrieve the payload, the detector extracts the features, estimates the bits, and applies majority voting on the corresponding bits from the different repetitions to find each of the bit values in the bit string. Such majority voting system may use a threshold on the outcome of the voting to assess the reliability of a detection and possibly reject a detection if it is not reliable enough. Optionally, error correction coding can be used to correct a number of bit errors.

Detector 400 employs as above one splitter 110, two accumulators 120a, 120b and two feature extractors 125a, 125b. The output of each feature extractor is provided to a respective bit estimator 426a, 426b, which estimates bits of the binary representation from the extracted features. The estimate for the payload expected after the chosen point is then transformed by payload mapper 429 to a bit estimate for a payload expected before the chosen point. Next, a majority voting module 430 applies a majority voting algorithm to the estimated watermark bits to determine which payload has been detected.

To come to a reliable detection in problematic situations, the majority voting method often needs a period that spans more than one payload. This can be achieved by searching for the breakpoints and mapping the payloads back to a single instance. A large number of mapping types, dependent on the payload, are possible. Fortunately, the probability of the different types decreases exponentially, so by only trying a limited number of mappings, the most likely ones, we get the correct one with large probability. The inventor has found that in commercially available watermark systems, trying ten mapping types gives a probability of 99.9% of finding the correct one.

As an illustrative example, consider a watermark system in accordance with this embodiment that embeds a payload p of N bits, i.e. a payload that is a value between 0 and N. Let $P_{(2)}=b_1 b_N$ be the N-bit representation of p. This binary representation is repeated a number of times, say R times, to form the watermark pattern $W=w_1, \ldots, w_{R*N}$ that is embedded into the frames of the watermark. When the entire watermark pattern W has been embedded, the payload is updated and a new watermark pattern is constructed. The length of content necessary to embed the entire pattern is called the period.

For example, let N=10, then the payload p is a value between 0 and $2^{10}1=1023$, inclusive. Let p=361, then its binary representation is 0101101001. If the number of repetitions R is chosen as 50, then the watermark pattern embedded in the video stream is a 500-bit pattern formed by the 50 repetitions of the payload bits 0101101001. Suppose that after each period of 500 frames, the payload is updated by an increment of one. Then the new payload is 362 and the new watermark pattern is formed by 50 repetitions of the binary representation 0101101010. So $W=w_1, \ldots, w_{500}$ where $w_1, \ldots, w10=w_{11}, \ldots, w_{20}=0101101010$.

In practice, the watermark pattern will also contain of some fixed binary reference pattern that allows the detector to align the bits extracted from the video to their correct position in the binary representation. For simplicity, we leave out the reference pattern and assume the detector knows the bit alignment.

The bit estimators 426a, 426b now take the frames from the detection window corresponding to a certain period and estimate the embedded symbols, denoted by $S=s_1, \ldots, s_{500}$. In general, these estimations are very unreliable and may have a correctness probability of only slightly more than 50%. The estimates corresponding to the particular bit positions: $S_1=s_1, s_{11}, \ldots, s_{491}$ for bit 1, $S_2=s_2, s_{12}, \ldots, s_{492}$ for bit 2, etcetera, are gathered and fed to the majority voting module 430, which determines the value by means of majority voting.

A straightforward manner of majority voting is to let for example $b_1$ be detected as 0 if the number of zeros in $S_1$ is larger than the number of ones and vice versa. In the same way $b_1$ to $b_{10}$ are determined. The larger the number of votes (in this example, the number of votes per bit is 50), the more reliable the outcome of the detection is.

This embodiment somewhat resembles that of FIG. 2, in the sense that the mapping is carried out prior to the payload retrieval, of course with the difference that the present embodiment employs majority voting rather than correlation.

Note that in this embodiment there is no way to recognize or correct a false payload. This could be enabled by the application of an error-correcting code. When the redundancy bits of the error-correcting code depend on the payload bits in a linear way, the definition of the different types of payload mapping can be extended to the redundancy bits in a straightforward way.

An advantage of this embodiment is that it allows a better reliability of the voting and hence the detection. Suppose we would like to increase the number of votes per detection from 50 to 100. However, there are only 50 repetitions per payload, so we can gather only 50 votes per payload bit. Using the method of this embodiment we can map the votes of the second period onto those of the first and in this way use a larger number of votes. This mapping employs the fact that, although the detector does not know the payload values for either of the subsequent periods, it does know something about their relation.

Denote the payload of the first and second period by p and p', respectively, so p'=p+1. Let the binary representation be given by $p_{(2)}=b_1 \ldots b_{10}$ and $p'_{(2)}=b'_1 \ldots b'_{10}$, respectively. Suppose that p is even, so $b_{10}=0$. Then $b_1 \ldots b_9=b'_1 \ldots b'_9$ and $b_{10}$ is unequal to $b'_{10}$. Therefore the bitwise XOR of $p_{(2)}$ and $p'_{(2)}$ is 0000000001.

This implies that if p is even, the first nine payload bits are the same for both periods. Hence, the votes from the two periods can simply be put together, giving a total of 100 votes per bit. The last payload bit, however, did change. So the votes of the second period for this last payload bit need to be flipped before they can be put together with the votes for the first period. This defines the first type of payload mapping, which holds under the condition that p is even, i.e.

p % 2=0. This condition occurs with a probability of 50% (namely, half the payloads are even). Moreover, the validity of the condition needs to be checked after the payload has been computed.

Similarly, we can consider the case where p % 4=1, which occurs in 25% of the cases. Then the bitwise XOR of $p_{(2)}$ and $p'_{(2)}$ is 0000000011. In this case, the payload mapping on the second period leaves the votes for the first eight payload bits untouched, but flips the votes for the last two payload bits. Again the result has to be checked afterwards for the payload condition p % 4=1.

The previously discussed embodiments of the detector 100, 200, 300, 400 all operate with an arbitrarily chosen location of the chosen point. Better results may be obtained by, upon failure to detect watermark features, choosing at least one new point and trying again. This selection can be done in a variety of ways, preferably based on the location of the chosen point and a length of the first or the second segment. The attempt to detect the watermark patterns using a newly chosen point may be repeated until either the watermark features are detected or a chance of detecting the watermark features is below a predefined threshold.

In a further embodiment two new points are chosen at a distance substantially equal to the length of the first or the second segment, and the old point being substantially halfway the first new point and the second new point.

As discussed, the transition from the first to the second watermark may be deterministic, for example if watermark patterns are pseudo-random and the payload is encoded in the circular shift of the patterns, the transition is a change in the shift that is easy and deterministically reverted. However, plural possible transitions may exist between the watermark patterns in the first and the second segment. For example, when a binary representation is used, a multi-bit change may occur.

In such a case, it is impossible to say with certainty what change may occur between the first and second segments. To address this issue, the transformation should comprise electing one of the plural possible transitions which has a relatively highest probability of being present at the chosen point. Of course this election process is then preferably repeated until either the watermark has been detected or the probability of the further possible transition is below a predefined threshold.

In a further embodiment the detection window may be chosen to be large enough to accommodate more than two segments. In such an embodiment the mapping of the second set of samples onto the first could be expanded by mapping samples from the third segment onto the second segment, or directly onto the first segment.

As a final note, it is to be understood that one may alternatively perform all steps recited for the first set on the second set and vice versa. This reason is that if the first payload has been detected, one also knows the second payload has been detected. This may obviate the need to process further segments to detect the second payload, denoted P2, (and possibly following payloads P3 . . . Pn). The mere length of the content then reveals which further watermarks are detected. To avoid false positives, a simpler watermark detection (e.g. lower threshold) on segments putatively containing P3 . . . Pn may be applied to confirm. Because search is for known payload the lower threshold is justified. Further, the mapping may be applied multiple times if the detection window spans multiple periods. This allows a yet further improvement of the detection quality. For brevity reasons this will not be elaborated upon.

The above provides a description of several useful embodiments that serve to illustrate and describe the invention. The description is not intended to be an exhaustive description of all possible ways in which the invention can be implemented or used. The skilled person will be able to think of many modifications and variations that still rely on the essential features of the invention as presented in the claims. In addition, well-known methods, procedures, components, and circuits have not been described in detail.

The invention is preferably implemented in a computer program product, i.e. a collection of computer program instructions stored on a computer readable storage device for execution by a computer. The instructions of the present invention may be in any interpretable or executable code mechanism, including but not limited to scripts, interpretable programs, dynamic link libraries (DLLs) or Java classes. The instructions can be provided as complete executable programs, as modifications to existing programs or extensions ("plugins") for existing programs. Moreover, parts of the processing of the present invention may be distributed over multiple computers or processors for better performance, reliability, and/or cost.

Machine-readable storage devices suitable for storing computer program instructions include all forms of nonvolatile memory, including by way of example semiconductor memory devices, such as EPROM, EEPROM, and flash memory devices, magnetic disks such as the internal and external hard disk drives and removable disks, magneto-optical disks and CD-ROM disks. The computer program product can be distributed on such a storage device, or may be offered for download through HTTP, FTP or similar mechanism using a server connected to a network such as the Internet. To this end one may connect a server system comprising the storage medium discussed above to a network, and arrange this server for allowing the instructions to be downloaded to client systems connected directly or indirectly to the network.

When constructing or interpreting the claims, any mention of reference signs shall not be regarded as a limitation of the claimed feature to the referenced feature or embodiment. The use of the word "comprising" in the claims does not exclude the presence of other features than claimed in a system, product or method implementing the invention. Any reference to a claim feature in the singular shall not exclude the presence of a plurality of this feature. The word "means" in a claim can refer to a single means or to plural means for providing the indicated function.

The invention claimed is:

1. A method of detecting a watermark embedded in a content stream, the watermark having a watermark pattern and a payload encoded in the watermark pattern, a payload encoded in the watermark pattern in a first segment of the content stream being different from a payload encoded in the watermark pattern in a second segment of the content stream, the payload in the second segment of the content stream having a predetermined relationship with the payload in the first segment of the content stream, the method comprising:

selecting a point in the content stream as an end of the first segment and a beginning of the second segment, sampling the content stream to obtain a first set of samples that is before the selected point and a second set of samples that is after the selected point, and detecting the watermark on a combination of the first set and a transformation of the second set, where the transformation exploits the relationship that exists between the different payloads in the first and second segments.

2. The method of claim 1, wherein detecting comprises accumulating data from the content stream and correlating for a detection pattern on features extracted from the accumulated data, and wherein the transformation takes place on one of:

accumulated data accumulated from after the selected point, a result of the correlation of this accumulated data with the detection pattern, a further detection pattern that is designed to correlate with features in the second segment, and a part of the detection pattern so as to correlate with features in the second segment.

3. The method of claim 1, wherein the watermark pattern represents a number of repetitions of a binary representation of the payload and the step of detecting comprises extracting features from the first and the second set of samples, and applying a majority voting algorithm on corresponding features for each possible repetition to determine the payload, wherein the transformation takes place as part of the extraction of the features in the second segment.

4. The method of claim 1, wherein a location of the selected point is arbitrarily selected.

5. The method of claim 1, wherein, upon failure to detect the watermark pattern, at least one new point is selected based on a location of the selected point and a length of the first or the second segment, and the steps of sampling and performing the detecting are repeated using the new selected point.

6. The method of claim 5, wherein two new points are selected at a distance substantially equal to the length of the first or the second segment, and the old selected point being substantially halfway the first new selected point and the second new selected point.

7. The method of claim 5, wherein upon a failure to detect the watermark pattern, the steps of the method are repeated until either the watermark pattern is detected or a chance of detecting the watermark pattern is below a predetermined threshold.

8. The method of claim 1, wherein plural possible transitions may exist between the watermark patterns in the first and the second segment, and the transformation comprises electing one of the plural possible transitions which has a relatively high probability of being present at the selected point.

9. The method of claim 1, wherein plural possible transitions may exist between the watermark patterns in the first and the second segment, and the transformation comprises electing one of the plural possible transitions which has a relatively high probability of being present at the selected point.

10. The method of claim 9, wherein the method, upon a failure to detect the watermark pattern using the elected possible transition, repeatedly elects a further possible transition from the plural possible transitions until either the watermark pattern has been detected or the probability of the further possible transition is below a predefined threshold.

11. A system comprising a processor configured to execute the method of claim 1.

12. A computer program product comprising a machine-readable storage device storing computer program code data configured for executing the method of claim 1.

* * * * *